United States Patent [19]
Kidoh et al.

[11] 3,966,696
[45] June 29, 1976

[54] PROCESS FOR PRODUCING VINYLCHLORIDE RESIN HAVING A HIGHLY POROUS UNIFORM GRANULAR STRUCTURE

[75] Inventors: Kunizoh Kidoh; Hidetora Kashio; Toshio Hosokawa; Kazuo Kusida, all of Iwaki, Japan

[73] Assignee: Kureha Kagaku Kogyo Kabushiki Kaisha, Japan

[22] Filed: Mar. 6, 1975

[21] Appl. No.: 555,994

[30] Foreign Application Priority Data
Mar. 9, 1974 Japan................................ 49-26768

[52] U.S. Cl..................................... 526/199; 260/8; 260/17 A; 260/17.4 SG; 526/200; 526/201; 526/203; 526/218; 526/227; 526/327; 526/329; 526/332; 526/345; 526/356
[51] Int. Cl.² ................... C08F 114/02; C08L 1/28; C08L 5/00
[58] Field of Search............... 260/17.4 SG, 17 A, 8, 260/92.8 W

[56] References Cited
UNITED STATES PATENTS

| | | | |
|---|---|---|---|
| 2,862,913 | 12/1958 | Lynn et al........................... | 260/92.8 |
| 2,987,510 | 6/1961 | Lederer et al...................... | 260/92.8 |
| 3,288,772 | 11/1966 | Becker et al....................... | 260/92.8 |
| 3,311,579 | 3/1967 | Donat.................................. | 260/23 |
| 3,855,162 | 12/1974 | Durand et al...................... | 260/17.4 |

OTHER PUBLICATIONS

Chem. Absts. 70: 58623s, "Molding Compositions Based on Stabilized Poly(vinyl chloride)"; Kureha Chem. Ind. Co. Ltd.

Chem. Absts. 70: 90754w, "Suspension Media . . . Materials," Bentejac.

*Primary Examiner*—Edward M. Woodberry
*Attorney, Agent, or Firm*—Wenderoth, Lind & Ponack

[57] ABSTRACT

A process for suspension polymerization of vinyl chloride or a mixture of vinyl chloride and a monomer copolymerizable therewith in an aqueous medium in the presence of an oil-soluble polymerization catalyst is improved by the use of a suspending agent comprising a well known protective colloid and a saccharose alkyl ester.

5 Claims, 2 Drawing Figures

FIG. A
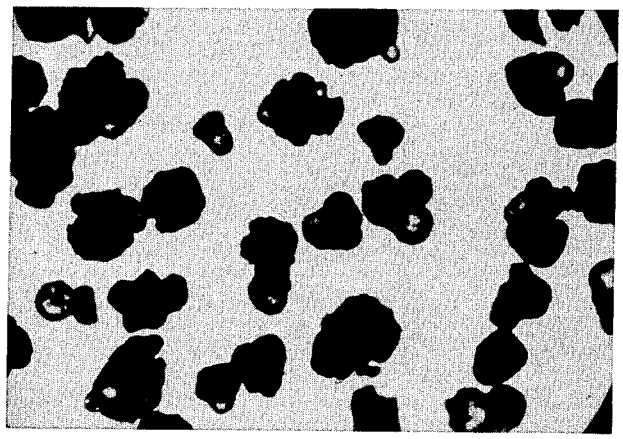
FIG. B
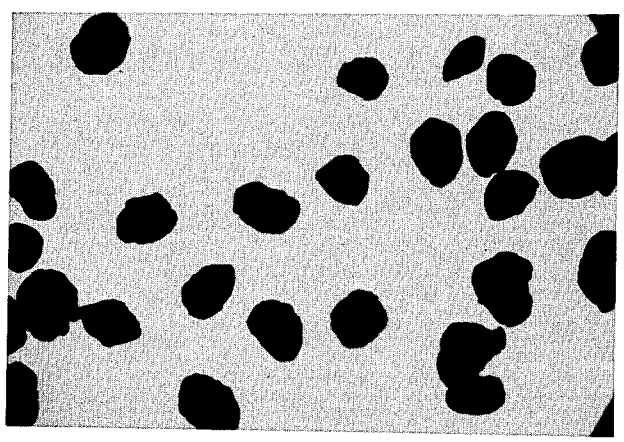

PROCESS FOR PRODUCING VINYLCHLORIDE RESIN HAVING A HIGHLY POROUS UNIFORM GRANULAR STRUCTURE

BACKGROUND OF THE INVENTION

This invention relates to improved suspension polymerization of vinyl chloride. The invention more specifically relates to the production of vinyl chloride resin having an excellent porous granular structure and high workability or processability and containing little residual monomer. The expression "polymerization of vinyl chloride" herein denotes homopolymerization of vinyl chloride and copolymerization of vinyl chloride and another ethylenically unsaturated monomer copolymerizable therewith, vinyl chloride being predominant. The expressions "vinyl chloride resin" and "vinyl chloride polymer" herein denote homopolymer and copolymers of vinyl chloride, vinyl chloride being predominant.

Suspension polymerized vinyl chloride resins have been widely used as materials in the form of rigid or non-or little plasticized resins as well as of soft or plasticized resins to be molded into various articles.

However, the polymers and copolymers thus obtained have been accompanied by problems such as low absorption rates of stabilizers and plasticizers in the polymer or copolymer and, moreover, differences in these absorption rates within each grain and between grains, whereby the workability of these polymers and copolymers deteriorate, even causing fish eyes. Furthermore, these problems are aggravated when a low degree of polymerization is selected in order to obtain high workability. In other words, the grains of a polymer obtained by suspension polymerizing at an elevated temperature are less porous and frequently are very nearly transparent. Such vinyl chloride polymers of a low degree of polymerization are used for blow molding because of their high workability as rigid resins and are useful in the production of packaging containers for commodities such as wines, cooking oils, sauces, and the like.

However, from the view-point of food sanitation, a slight content of residual vinyl chloride monomer or chain-transfer agents of the order of p.p.m (part per million) of the thus polymerized polymer has recently become a problem. Although the residual content of the monomer depends on the drying condition of the polymer, and also with the compounding conditions of the polymer, the content is further affected by the granular structure of the polymer beads and by microporosity which constitutes an important factor for evaporating the monomer.

With respect to the suspension polymerization of vinyl chloride, there have been proposed various procedures which are directed to producing polymer beads or grains which have granular homogeneity or improved porosity in beads thereby to improve the workability of the polymer and also to minimizing the quantity of scales which are frequently deposited in a polymerization vessel.

In these procedures, there is ordinarily used a suspending agent such as polyvinyl alcohol, a copolymer of vinyl acetate and maleic anhydride, a cellulose derivative, a polyethyrene oxide, gelatine, and also various combinations of two or more of these materials. The suspending agent may further be combined with a nonionic surfactant or with an anionic surfactant plus a water soluble inorganic polyvalent salt.

However, for evaluating these polymerizing procedures from the viewpoint of elevating the average porosity of the thus polymerized resin, the bulk density of the resin, quantity of plasticizer retention in the resin, rate of absorption of a plasticiser in the resin, feasibility of gelation, and the like have been used as reference criteria, but since these reference criteria are not necessarily suitable for nonuniformity between the beads of the polymer thus produced, the aforementioned procedures cannot be said to be satisfactory in reducing the residual monomers and eliminating fish eyes. This is particularly true when the monomers are polymerized at an elevated temperature for reducing the degree of polymerization, and therefore it has been difficult to obtain a polymer which has sufficient porosity and minimal quantity of a residual monomer.

SUMMARY OF THE INVENTION

A primary object of the present invention is to provide a process for suspension polymerization of vinyl chloride whereby the aforementioned problems of the conventional procedures can be substantially eliminated.

Another object of the invention is to provide a process for suspension polymerization of vinyl chloride whereby vinyl chloride resin of high porosity and excellent gelation, having minimal amount of residual monomers and uniformly distributed grain size can be obtained.

Still another object of the invention is to provide a process for suspension polymerization of vinyl chloride whereby deposition of scales in the polymerization vessel can be substantially prevented.

With these objects in view and other objects hereinafter made apparent, this invention provides a process for suspension polymerization of vinyl chloride or of a mixture of vinyl chloride and an ethylenically unsaturated monomer copolymerizable therewith in an aqueous medium containing a suspending agent in the presence of an oil-soluble polymerization catalyst, characterised by the use of a suspending agent comprising a protective colloid and a saccharose ester which is an ester of one mole of sacchrose with from 1 to 3 moles of an aliphatic monocarboxylic acid having from 8 to 18 carbon atoms.

The invention will now be described with reference to the accompanying illustrations.

BRIEF DESCRIPTION OF THE ILLUSTRATIONS

In the illustrations:

FIGS. A and B illustrate microscopic structures of vinyl chloride resin produced in accordance with Reference Example 1 and Example 4 according to this invention, respectively.

DETAILED DESCRIPTION

With the aim of producing by suspension polymerization vinyl chloride resins of highly improved worability and porosity thereby containing least amount of a residual monomer, we have studied various combinations of suspending agents such as protective colloids and emulsifiers for use in the process taking the apparent density distribution and residual monomer content as criteria and have found that the porosity of the suspension-polymerized vinyl chloride resins can be remarkably improved and the content of residual monomer can be thereby reduced by using a suspending agent comprising a protective colloid which is in itself publicly known, and an emulsifier comprising an alkylester of saccharose.

Furthermore, there is an interrelation between the porosity and the bulk density (g/cc) of an ordinary polymer of granular structure, and an elevation of the porosity causes a reduction of the bulk density. This feature, also having a relation to the extruded quantity of vinyl chloride resins, has constituted a bottleneck in practical application. However, the vinyl chloride polymer made in accordance with the present invention has a relatively great bulk density in spite of its elevated porosity.

The above described characteristic of the vinyl chloride suggests a structure of a kind wherein each of the grains or beads having microscopically smooth surfaces also has a microporous structure as viewed in its entirety. It is considered that such a structure of the polymer acts advantageously for evaporating off residual monomer when the polymer is dried out.

Since the saccharose ester used with the protective colloid is of a type approved for use as a food additive, a vinyl chloride resin thus obtained constitutes a material safe for packaging foodstuffs. Furthermore, the suspending agent used in the production process of this invention comprises a widely known protective colloid selected from water soluble high molecular materials such as polyvinyl alcohol, polyethylene oxides, water-soluble cellulose derivatives such as alkali metal carboxymethyl cellulose, polyvinyl pyrrolidone, copolymers of vinyl acetate and maleic anhydride, gelations, and the like and is generally used in a range of from 0.01 to 0.5 percent by weight of the vinyl chloride monomer or a monomer mixture of vinyl chloride and an ethylenically unsaturated monomer copolymerizable therewith.

The saccharose esters used with this protective colloid are esters of one mole of saccharose with from one to three moles of an aliphatic monocarboxylic acid (alkanoic acid) containing from 8 to 18 carbon atoms (saccharose alkanoates). The aliphatic monocarboxylic acids are preferably saturated ones, examples of which include caprylic, capric, lauric, myristic, palmitic, and stearic acids. Mixed esters are also usable. The saccharose ester may be used singly or as a mixture.

The quantity of the saccharose ester used with the protective colloid is varied depending on the kind and quantity of the protective colloid in a range of from 0.5 to 0.005 percent by weight, preferably from 0.1 to 0.01 percent by weight, of the vinyl chloride monomer or the monomer mixture.

Examples of catalysts suitable for use in the invention are oil-soluble radical catalysts such as diacylperoxides as lauroyl peroxide and benzoyl peroxide; dialkylperoxydicarbonates such as diisopropylperoxydicarbonate and di(2-ethylhexyl) peroxydicarbonate; and azo compounds such as azobisisobutyronitrile.

The ethylenically unsaturated monomers copolymerizable with vinyl-chloride may be any of vinyl ethers such as cetyl vinyl ether; vinyl esters such as vinyl formate and vinyl acetate; vinylidene halides such as vinylidene chloride and vinylidene fluoride; vinyl halides other than vinyl chloride such as vinyl bromide and vinyl fluoride; alkyl acrylates having 1 to 18 carbon atoms in the alkyl such as methyl, n-butyl, and lauryl acrylate; alkyl methacrylates having 1 to 18 carbon atoms in the alkyl such as methyl, n-butyl, and lauryl methacrylate; monoolefins of 1 to 3 carbon atoms such ethylene and propylene. These comonomers are used in a quantity smaller than that of vinyl chloride monomer, preferably in less than 50 percent by weight of vinyl chloride.

The present invention is directed to aqueous suspension polymerization of vinyl chloride and thus polymerization conditions or characteristics of aqueous suspension polymerization of vinyl chloride except for the use of the specified suspending agent may be employed here in the present invention.

Aqueous suspension polymerization technique is well known in the act, and the present invention is carried out under the conditions of temperature of 50° to 70°C, pressure of 7.0 to 12.0 kg/cm$^2$ gauge, and monomer concentration in the aqueous dispersion of 40 to 80 percent by weight.

The invention will be described in more detail with respect to various examples.

REFERENCE EXAMPLES

Polymerization:

Into an autoclave made of stainless steel and having a capacity of 10 liter was charged 1.2 g of polyvinyl alcohol, a product of Nippon Gosei Co., 6,000 g of water in which was dissolved 0.6 g of methyl cellulose made by Shinetsu Kagaku Co. and 1.5 g of lauroyl peroxide. The system was completely sealed from the outer atmosphere and thoroughly purged with nitrogen.

Then, 3,000 g of liquefied vinyl chloride monomer mixed with a predetermined amount of an emulsifier selected from the group listed in Table 1 was introduce under pressure into the autoclave in the above described state in accordance with each of the reference examples. The content of the autoclave was then agitated for 30 minutes at room temperature and then polymerized at a temperature of 67°C under agitation. The process was terminated when the internal pressure of the autoclave was lowered by 6.0 kg/cm$^2$ from that of the equilibrium state, and the polymerized product for each example was taken out of the autoclave. All of the examples of polymers thus prepared were dried out for 20 hours in a ventilation type drier at 60°C.

Measurement of apparent density distribution:

Zinc chloride solutions of selected different specific gravities (in a range of from 1.10 to 1.30) were prepared. 10 g of the polymer in powder from was added to and thoroughly soaked in each of these solutions, which were then left standing until the contents were separated into buoyant parts and precipitated parts. These parts were taken out, washed with water, dried, and the weights thereof were measured for determining the percentage distribution of each.

A apparent density distribution which contains smaller percentages of those heavier than 1.25 may be said to be related to higher porosity.

Measurement of Residual Monomer:

A specific quantity of carbon disulfide was added to a specific amount of granular polymer constituting each example immediately after it has been dried as described hereinbefore thereby to extract residual monomeric vinyl chloride (VC). The quantity of vinyl chloride in the extract was measured by gas chromatography.

Table 1

| Reference Example | Emulsifier | Quantity (g) | g/cc | Grain Size Distribution (% by weight) | | | | | | Apparent Density Distribution (% by weight) | | | | | Residual vc ppm |
|---|---|---|---|---|---|---|---|---|---|---|---|---|---|---|---|
| | | | | over 42 mesh | over 60 mesh | over 80 mesh | over 100 mesh | over 150 mesh | under 150 mesh | ~1.10 | ~1.15 | ~1.20 | ~1.25 | 1.25< | |
| 1 | none | 0 | 0.530 | 0 | 2.4 | 13.2 | 35.2 | 38.2 | 11.0 | 2 | 2 | 10 | 25 | 61 | 680 |
| 2 | Pronon 208 | 3.0 | 0.440 | 0 | 1.1 | 15.0 | 37.8 | 32.1 | 14.0 | 23 | 22 | 20 | 25 | 10 | 44 |
| 3 | Aquaprene | 3.0 | 0.522 | 0 | 1.8 | 29.0 | 38.3 | 22.4 | 8.5 | 3 | 2 | 14 | 28 | 53 | 493 |
| 4 | Newcol 20 | 2.4 | 0.502 | 23.1 | 25.5 | 13.1 | 19.0 | 13.1 | 6.2 | 8 | 13 | 28 | 26 | 25 | 300 |
| 5 | SP-60N | 1.5 | 0.480 | 0 | 3.8 | 32.3 | 32.3 | 23.5 | 8.1 | 20 | 19 | 22 | 6 | 34 | 309 |
| 6 | OP-8OR | 1.5 | 0.500 | 0.4 | 14.5 | 26.7 | 37.3 | 13.9 | 7.2 | 38 | 13 | 9 | 3 | 17 | 120 |
| 7 | " | 0.6 | 0.468 | 3.7 | 20.7 | 22.4 | 22.5 | 21.2 | 9.5 | 20 | 31 | 19 | 12 | 18 | 183 |

Note:
Pronon 208 (manufactured by Nippon Yushi Co.) is a block polymer of polyethyrene oxide and polypropylene oxide.
Aquaprene (manufactured by Meisei Kagaku Co.) is a product obtained by end etherification of polyethyrene oxide.
Newcol 20 (manufactured by Nippon Nyukazai Co.) is sorbitan monolaurate.
SP-60N (manufactured by Nippon Yushi Co.) is sorbitan monostearate.
OD-80R (manufactured by Nippon Yushi Co.) is sorbitan trioleate.

When the kinds of the emulsifiers were changed as indicated in the reference examples 1 through 7, a great quantity of scales or coarse grains were sometimes produced, thus making it difficult to compare these examples at the same predetermined quantities thereof. However, the examples were compared at quantities appropriate to be produced into granular forms, and the results are indicated in the Table 1. From these results, it is generally made apparent that the extent of porosity caused by the addition of the emulsifiers is not sufficient although the tendency thereof is recognizable. In the Reference Example 2 in which a polymer was obtained comparatively more porous than in other examples, it is found that the bulk preparations comprise one or more of these saccharose esters.

As will be apparent from Table 2, the optimum quantity of saccharose ester used as an emulsifier is varied in accordance with HLB value of the ester. If an excessive quantity of the ester is used, greater quantity of scales will be created. However, as long as an optimum quantity of the ester is used, the creation of scales can be prevented, and a polymer which is superior in porosity and contains minimal amount of residual monomer can be obtained. It is also found that the bulk density of the polymer thus obtained is substantially comparable to that of the polyvinyl chloride resin available on the market.

Table 2

| Example | Emulsifier | Quantity (g) | HLB | g/cc | Grain Size Distribution (% by weight) | | | | | | Apparent Density Distribution (% by weight) | | | | | Residual VC ppm |
|---|---|---|---|---|---|---|---|---|---|---|---|---|---|---|---|---|
| | | | | | over 42 mesh | over 60 mesh | over 80 mesh | over 100 mesh | over 150 mesh | under 150 mesh | <1.10 | ~1.15 | ~1.20 | ~1.25 | 1.25< | |
| 1 | Nitto Ester S-770 | 3.0 | 7.0 | 0.410 | 5.0 | 0 | 0 | 2.6 | 44.9 | 48.5 | 100 | 0 | 0 | 0 | 0 | 0 |
| 2 | " | 1.5 | " | 0.472 | 68.5 | 15.8 | 3.6 | 2.9 | 4.3 | 5.4 | 100 | 0 | 0 | 0 | 0 | 0 |
| 3 | " | 0.9 | " | 0.504 | 66.9 | 12.0 | 3.7 | 7.2 | 3.7 | 6.4 | 99 | 1 | 0 | 0 | 0 | 0.8 |
| 4 | " | 0.6 | " | 0.520 | 0 | 49.9 | 17.0 | 16.0 | 10.5 | 6.6 | 21 | 64 | 13 | 2 | 0 | 5.6 |
| 5 | Nitto Ester S-1170 | 3.0 | 11.0 | 0.360 | 0 | 2.1 | 61.7 | 28.1 | 7.6 | 0.5 | 96 | 4 | 0 | 0 | 0 | 0 |
| 6 | " | 0.6 | " | 0.540 | 38.6 | 8.3 | 4.1 | 8.3 | 17.9 | 22.8 | 80 | 6 | 14 | 0 | 0 | 2.8 |
| 7 | " | 0.45 | " | 0.520 | 8.6 | 51.3 | 26.1 | 7.0 | 4.6 | 2.4 | 36 | 47 | 11 | 6 | 0 | 8.7 |
| 8 | Nitto Ester P-1570 | 1.5 | 14.0 | — | — | — | — | — | — | — | 92 | 8 | 0 | 0 | 0 | 0 |
| 9 | " | 0.6 | " | 0.525 | 53.0 | 13.3 | 4.6 | 10.6 | 6.7 | 11.8 | 95 | 5 | 0 | 0 | 0 | 3.1 |
| 10 | DK Ester, DK-F-20 | 1.1 | 2.0 | 0.513 | 14.4 | 48.8 | 9.6 | 9.0 | 9.1 | 9.1 | 41 | 29 | 20 | 7 | 3 | 15.0 |

Note:
Nitto Ester S-770 : Mixture of Saccharose mono-(40%), di- and tri-alkanoates (stearate 70%, palmitate 30%)
"S-1170 : Mixture of saccharose mono-(50%), di- and tri-alkanoates (stearate 70%, palmitate 30%)
"S-1570 : Mixture of saccharose mono-(70%), di- and tri-alkanoates (palmitate 70%, stearate 30%)
DK Ester DK-F-20 : Mixture of saccharose mono-(10%), di- and tri-stearates density thereof is reduced.

EXAMPLES OF THE INVENTION

Examples 1 through 10

The procedure described in the aforementioned Reference Examples, was carried out with only the exception that emulsifiers were substituted by saccharose esters. The test results for the polymers thus obtained are indicated in Table 2.

For the saccharose ester, those available on the market under the trade names of Nitto Ester (manufactured by Dainippon Seito Co. Ltd.) and DK-Ester (manufactured by Daiichi Kogyo Seiyaku Co. Ltd.) were used. The carboxylic acid moiety of these commercial saccharose esters is steary or palmityl, and degree of esterification is 1, 2 or 3. These commercial The microscopic structure of vinyl chloride polymer obtained in accordance with Reference Example 1 is shown in the accompanying FIG. A, and that of the vinyl chloride polymer obtained in accordance with Example 4 according to the present invention is shown in FIG. B.

From these illustrations, it is apparent that the vinyl chloride polymer show in FIG. A contains numerous transparent spherical grains or beads and that many of these grains or beads are coagulated with each other. Conversely, in the vinyl chloride shown in FIG. B, all of the grains are opaque and porous, and, furthermore, substantially all of the grains are made of single grains not coagulated with each other. It is considered that the reason why the vinyl chloride polymer obtained by this invention contains substantially small amount of residual monomer resides in this structure.

EXAMPLE 11

Into an autoclave made of stainless steel and having a capacity of 10 liter, 6,000 g of deionized water in which 1.8 g of polyvinyl alcohol (made by Nippon Gosei Co.) was dissolved was charged. The entire system was sealed from the outside atmosphere, and the system was thoroughly purged with nitrogen gas. Then, into this system, 3,000 g of liquefied vinyl chloride monomer in which 0.75 g of diisopropylperoxydicarbonate (IPP) as a polymerization catalyst and 0.81 g of saccharose ester (Nitto Ester S-770) as an emulsifier were dissolved was introduced under pressure. The content of the autoclave was dispersed and agitated at room temperature for 30 minutes, and then heated to 67°C under agitation thereby to carry out polymerization. The polymerization was terminated when the pressure inside the autoclave decreased by 60 kg/cm$^2$ from the equilibrium pressure, and the content was taken out of the autoclave, washed with water, and dewatered. The polymer thus obtained was dried in a ventilated drier for 20 hours at 60°C.

The properties of the polymer thus obtained are shown in Table 3.

EXAMPLE 12

Instead of the polyvinylalcohol in Example 11, 0.9 g of polyethyrene oxide (manufactured by Meisei Kagaku Co. under the trade name of Alkox-E-100 and having an average molecular weight in a range of from 2,500,000 to 3,000,000) was used. Polymerization was carried out under conditions which in all other respect was the same as those specified in Example 11.

The properties of the polymer thus obtained are shown in Table 3.

little residual monomer and having a uniformly distributed grain size by suspension polymerization of vinyl chloride or a mixture of vinyl chloride and an ethylenically unsaturated monomer copolymerizable therewith, vinyl chloride being predominant, in an aqueous medium containing a suspending agent in the presence an oil-soluble polymerization catalyst, the improvement which comprises the use of a suspending agent comprising a protective colloid and a saccharose ester which is an ester of one mole of saccharose with from 1 to 3 mole of an aliphatic monocarboxylic acid having 8 to 18 carbon atoms, the quantity of the protective colloid being in the range of from 0.01 to 0.5 percent by weight of said vinyl chloride monomer or said mixture and the quantity of saccharose ester being in the range of from 0.005 to 0.5 percent by weight of said vinyl chloride monomer or said mixture.

2. A process as claimed in claim 1 in which the protective colloid is a member selected from the group consisting of polyvinyl alcohols, polyethylene oxides, water-soluble cellulose derivatives, polyvinyl pyrrolidones, copolymers of vinyl acetate and maleic anhydride, and gelatins.

3. A process as claimed in claim 1 in which the saccharose ester is used singly or a mixture in a quantity of from 0.1 to 0.01 percent by weight of said vinyl chloride monomer or said mixture.

4. A process as claimed in claim 1 in which the catalyst is a member selected from the group consisting of diacyl peroxides, dialkylperoxydicarbonates, and azo compounds.

5. A process as claimed in claim 1 in which the ethylenically unsaturated monomer is a member selected from the group consisting of vinyl ethers, vinyl esters, vinylidene halides, vinyl halide other than vinyl chloride, alkyl acrylates, alkyl methacrylates, and monoolefins.

\* \* \* \* \*

Table 3

| Example | g/cc | Gran Size Distribution (% by weight) | | | | | | Apparent Density Distribution (% by weight) | | | | | Residual VC ppm |
|---|---|---|---|---|---|---|---|---|---|---|---|---|---|
| | | over 42 mesh | over 60 mesh | over 80 mesh | over 100 mesh | over 150 mesh | under 150 mesh | <1.10 | ~1.15 | ~1.20 | ~1.25 | 1.25< | |
| 11 | 0.532 | 4.5 | 5.3 | 13.8 | 28.4 | 33.2 | 14.7 | 46 | 52 | 2 | — | — | 8.2 |
| 12 | 0.510 | 0 | 1.4 | 8.3 | 36.9 | 35.5 | 17.9 | 50 | 43 | 7 | — | — | 5.3 |

We claim:

1. In a process for producing vinyl chloride resin having a highly porous granular structure containing